(12) United States Patent
Siomina

(10) Patent No.: US 11,224,024 B2
(45) Date of Patent: Jan. 11, 2022

(54) METHODS FOR CONTROLLING UE SYNCHRONIZATION AND CELL IDENTIFICATION IN NR

(71) Applicant: TELEFONAKTIEBOLAGET LM ERICSSON (PUBL), Stockholm (SE)

(72) Inventor: Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 16/479,637

(22) PCT Filed: Jan. 3, 2018

(86) PCT No.: PCT/IB2018/050038
§ 371 (c)(1),
(2) Date: Jul. 22, 2019

(87) PCT Pub. No.: WO2018/146559
PCT Pub. Date: Aug. 16, 2018

(65) Prior Publication Data
US 2021/0337497 A1  Oct. 28, 2021

Related U.S. Application Data

(60) Provisional application No. 62/458,485, filed on Feb. 13, 2017.

(51) Int. Cl.
*H04W 56/00* (2009.01)
*H04J 11/00* (2006.01)

(52) U.S. Cl.
CPC ..... *H04W 56/0015* (2013.01); *H04J 11/0079* (2013.01)

(58) Field of Classification Search
CPC ............... H04J 11/0079; H04J 11/0073; H04J 11/0076; H04J 11/0069; H04L 5/0048;
(Continued)

(56) References Cited

U.S. PATENT DOCUMENTS

2012/0122446 A1 5/2012 Malladi et al.
2018/0006702 A1* 1/2018 Doostnejad ............ H04B 7/088
2019/0229961 A1* 7/2019 Gao ..................... H04J 11/0073

FOREIGN PATENT DOCUMENTS

RU    2433530 C2   11/2011

OTHER PUBLICATIONS

Ericsson, "NR Cell reselection," 3GPP TSG-RAN WG2 NR Ad Hoc, R2-1700549; Spokane, Washington, USA, Jan. 17-19, 2017, 3 pages.
(Continued)

*Primary Examiner* — Ricardo H Castaneyra

(57) ABSTRACT

A wireless device is configured for use in a wireless communications network. In one embodiment, the wireless device is configured to obtain various transmission parameters associated with one or more synchronization signals (SS)-transmitted by a network node during a first time period and a second time period and determine one or more antenna configuration characteristics C of the network node operable to transmit the SS. The wireless device is further configured to determine a time Tss associated with a measurement of the SS based on the obtained parameters and the determined antenna configuration characteristics C.

23 Claims, 16 Drawing Sheets

(58) Field of Classification Search
CPC . H04L 5/0051; H04L 5/0053; H04L 27/2607;
H04L 27/26025; H04L 27/2602; H04W
76/11; H04W 56/0015; H04W 56/001;
H04W 56/00; H04W 56/0045; H04W
16/28; H04W 72/046; H04W 24/10;
H04W 48/10; H04B 7/0608; H04B
7/0802; H04B 7/06; H04B 7/0691; H04B
7/0695; H04B 7/088; H04B 17/24
See application file for complete search history.

(56) References Cited

OTHER PUBLICATIONS

Samsung, "Cell search for NR: design consideration," 33GPP TSG RAN WG1 #85, R1-163997; Nanjing, China, May 23-27, 2016, 6 pages.
Ericsson, "Faster measurements and signaling for Ultra reliable mobility," 3GPP TSG-RAN WG2 NR Ad Hoc, R2-1700472; Spokane, Washington, USA, Jan. 17-19, 2017, 5 pages.
Ericsson, "RRC Measurement report triggering and content," 3GPP TSG-RAN WG2 Nr Ad Hoc, R2-1700541 Spokane, Washington, USA, Jan. 17-19, 2017, 5 pages.

* cited by examiner

METHODS FOR CONTROLLING UE SYNCHRONIZATION AND CELL IDENTIFICATION IN NR

RELATED APPLICATIONS

This application is a 371 of International Application No. PCT/IB2018/050038, filed Jan. 3, 2018, which claims the priority and benefit of U.S. Patent Application 62/458,485, filed Feb. 13, 2017, entitled "Methods for Controlling UE Synchronization and Cell Identification in NR" the disclosures of which are fully incorporated herein by reference.

TECHNICAL FIELD

The disclosed subject matter relates generally to telecommunications. Certain embodiments relate more particularly to concepts such as configuration of signals for synchronization in a wireless communications network.

BACKGROUND

I. NR architecture

NR (a.k.a. 5G or Next Generation) architecture is being discussed in 3GPP research activities and a current network architecture concept is illustrated in FIG. 5, where eNB denotes an LTE eNodeB, gNB denotes an NR BS (one NR BS may correspond to one or more transmission/reception points), and the lines between the nodes illustrate the corresponding interfaces which are under discussion in 3GPP. Further, FIG. 6 illustrates four different deployment scenarios with NR BSs which are discussed in 3GPP research activities.

II. Multi-Antenna Schemes in NR

Multi-antenna schemes for NR are currently being discussed in 3GPP research activities. For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore, MIMO schemes for NR are also called massive MIMO. For around 30/70 GHz, up to 256 Tx and Rx antenna elements are assumed. Extension to support 1024Tx at 70 GHz is agreed and it is under discussion for 30 GHz. For sub-6 GHz communication, to obtain more beamforming and multiplexing gain by increasing the number of antenna elements is also a trend.

With massive MIMO, three approaches to beamforming have been discussed: analog, digital, and hybrid (a combination of the two). The analog beamforming would compensate high pathloss in NR scenarios, while digital precoding would provide additional performance gains similar to MIMO for sub-6 GHz necessary to achieve a reasonable coverage. The implementation complexity of analog beamforming is significantly less than digital precoding since it is in many implementations relies on simple phase shifters, but the drawbacks are its limitation in multi-direction flexibility (i.e., a single beam can be formed at a time and the beams are then switched in time domain), only wideband transmissions (i.e., not possible to transmit over a subband), unavoidable inaccuracies in the analog domain, etc. Digital beamforming (requiring costly converters to/from the digital domain from/to IF domain), used today in LTE, provides the best performance in terms of data rate and multiplexing capabilities (multiple beams over multiple subbands at a time can be formed), but at the same time it is challenging in terms of power consumption, integration, and cost; in addition to that the gains do not scale linearly with the number of transmit/receive units while the cost is growing rapidly. Supporting hybrid beamforming, to benefit from cost-efficient analog beamforming and high-capacity digital beamforming, is therefore desirable for NR. An example diagram for hybrid beamforming is shown in FIG. 7. Beamforming can be on transmission beams and/or reception beams, network side or UE side.

The analog beam of a subarray can be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, beam sweeping techniques provide basic coverage in NR. For this purpose, multiple OFDM symbols, in which differently steered beams can be transmitted through subarrays, can be assigned and periodically transmitted. FIG. 8 graphically illustrates beams being swept on two subarrays (represented by shaded beams) at a series of instances in time. FIG. 9 illustrates beam being swept on three subarrays at a series of instances in time.

III. Numerology

For LTE, the term "numerology" includes, e.g., the following elements: frame duration, subframe or TTI duration, slot duration, subcarrier spacing, cyclic prefix length, number of subcarriers per RB, number of RBs within the bandwidth (different numerologies may result in different numbers of RBs within the same bandwidth), number of symbols within a certain time unit e.g. 1 ms subframe, symbol length, etc.

The exact values for the numerology elements in different radio access technologies are typically driven by performance targets, e.g., performance requirements impose constraints on usable subcarrier spacing sizes, e.g., the maximum acceptable phase noise sets the minimum subcarrier bandwidth while the slow decay of the spectrum (impacting filtering complexity and guardband sizes) favors smaller subcarrier bandwidth for a given carrier frequency, and the required cyclic prefix sets the maximum subcarrier bandwidth for a given carrier frequency to keep overhead low.

However, the numerology used so far in the existing RATs is rather static and typically can be trivially derived by the UE, e.g., by one-to-one mapping to RAT, frequency band, service type (e.g., MBMS), etc.

In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers.

The support of multiple numerologies has been agreed for NR, which can be multiplexed in the frequency and/or time domain for the same or different UEs.

In NR which is to be based on OFDM, multiple numerologies will be supported for general operation. A scaling approach (based on a scaling factor $2^n$, $n \in N\_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of (2 m*15) kHz gives exactly ½m 0.5 ms for a slot that is 0.5 ms in the 15 kHz numerology.

Subcarrier spacings of at least up to 480 kHz are currently being discussed for NR (the highest discussed values correspond to millimeter-wave based technologies). It was also agreed that multiplexing different numerologies within a same NR carrier bandwidth is supported, and FDM and/or TDM multiplexing can be considered. It was further agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies. In FIG. 10, some candidate carrier spacings are illustrated with respect to the frequency and cell range. In Table 1, further details are provided on corresponding time durations for some candidate carrier spacings.

TABLE 1

Different OFDM numerologies

| Subcarrier spacing in kHz | OFDM symbol duration in μs | Cyclic prefix length in μs | Total symbol duration in μs |
| --- | --- | --- | --- |
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

IV. Cell Identification in LTE

Cell search is one of the basic UE operations in a cellular network. To find a cell, the UE receives radio signals and searches for signals with a specific, known to the UE, signature. To identify a new cell, the UE has to identify the cell and then, optionally or upon a request, obtain the globally unique CGI Cell Global Identity (CGI). In LTE, cell identification includes detection of the cell and additionally performing a signal strength or signal quality measurement (aka verification), where the measurement may be RSRP or RSRQ.

Cell detection is performed based on synchronization signals (SS) and more specifically on Primary Synchronization Signal (PSS) and Secondary Synchronization Signal (SSS). There are 504 unique physical-layer cell identities (PCIs). The physical-layer cell identities are grouped into 168 unique physical-layer cell-identity groups, each group containing three unique identities. The grouping is such that each physical-layer cell identity is part of one and only one physical-layer cell-identity group. A physical-layer cell identity is thus uniquely defined by a number in the range of 0 to 167, representing the physical-layer cell-identity group, and a number in the range of 0 to 2, representing the physical-layer identity within the physical-layer cell-identity group. The cell identity group is determined based on the known SSS sequences, and the identity within the group is determined based on the known PSS sequences. All unique combinations of PSS and SSS give 504 unique PCIs, which may be reused in the same PLMN network on one frequency and/or across frequencies. PCI of a cell can then be used to determine sequences of other signals (e.g., cell-specific reference signals, CRS, positioning reference signals, PRS, etc.) and its allocation in the time-frequency grid. The synchronization signals occupy 62 resource elements in the center of the allocated bandwidth as shown in FIGS. 11 and 12. In a synchronous network, PSS/SSS from one cell overlap/interfere with PSS/SSS from another cell, which correspond to reuse-1 or 100% load all the time on these signals.

RSRP and RSRQ measurements are performed on cell-specific reference signals (CRS). The CRS signals are allocated in time-frequency grid as shown in FIG. 13. Different cells can use 6 different shifts in frequency. In practice there is a reuse-6 pattern for CRS transmitted from 1 TX antenna ports and reuse-3 pattern for CRS transmitted from 2 TX antenna ports. In low load the interference could then be favorable for time measurements on CRS. In high load however the situation becomes similar to PSS/SSS. Practical networks, however, seldom operate with load higher than 70% in downlink, so the interference situation is typically better for CRS than for PSS/SSS. Interference conditions may be further improved on CRS by configuring ABS (reduced-power or low activity subframes) in the interfering aggressor cells.

CGI may be obtained via reading system information transmitted over a broadcast channel. The UE may be requested by eNodeB to report CGI of a cell identified by the UE; the request may be triggered by a measurement report for the identified cell received by eNodeB from the UE.

Cell identification may be performed in various ways. For example, cell identification may be performed on the frequency of a PCell (intra-frequency), on a frequency of an SCell, which is also a serving cell with carrier aggregation (inter-frequency, with carrier aggregation), on a different frequency than serving cell frequencies (inter-frequency), or on a different RAT (inter-RAT). Inter-frequency and inter-RAT may also be inter-band when the frequencies belong to different frequency bands.

Current cell identification requirements specify a certain period T during which the UE is to perform cell identification and report a corresponding event to the network. The required period T includes both the time necessary for detecting a cell and the time T1 for performing a measurement. The current standard specifies both T and T1 time periods. Further, the UE is typically required to report N (e.g., N=8 for intra-frequency) identified cells within the required period. The requirements for cell identification typically differ (e.g., in the measurement period length, number of cells, number of frequencies, etc.) for intra-frequency, inter-frequency and inter-RAT.

A non-CA UE would normally require measurement gaps for performing inter-frequency or inter-RAT cell identification. The same applies for a CA UE when performing cell identification on a non-configured or deactivated carrier.

SUMMARY

Certain embodiments of the disclosed subject matter are presented in recognition of shortcomings associated with conventional techniques and technologies, such as the following examples. In LTE networks, SS bandwidth, SS center frequency, SS periodicity, SS numerology, and the transmitting antenna for SS are always the same and fixed in the standard. However, it is envisioned that when a UE is performing a measurement in a NR network various aspects of a transmitted signal being measured can change. For example, a transmitted signal measured by the UE can change its BW (e.g., to a smaller or larger) and/or can be shifted in frequency (e.g., the center frequency of BW may change) during the measurement procedure. In addition, a set of transmitting beams for the signals/channels to be received by the UE for performing the measurement may change. Furthermore, the signals/channels to be received by the UE for performing a measurement may be transmitted in a beamformed and non-beamformed manner inter-changeably in time. Moreover, periodicity of a SS to be measured may change.

Along with any one or combination of the above challenges, the measurement performance may degrade or the corresponding procedure (e.g., synchronization or detection/identification) may even fail (e.g., a cell ID is determined incorrectly) or result in incorrectly determined channel properties (e.g., frequency or time shift) and inappropriate receiver configuration or tuning. If the receiver is tuned incorrectly, then the error may propagate even further to other UE measurements, data transmissions/receptions and other procedures (e.g., determining UE transmission timing).

In certain embodiments of the disclosed subject matter, a time Tss associated with a measurement (e.g., measurement time, reporting time, etc.) of the SS or SS blocks received at t1 and t2 is determined based on a combination of different parameters. The parameters may be obtained by the wireless device, directly or indirectly, and may include: a numerology NUM of the one or more synchronization signals (SS) or SS blocks at times t1 and t2; periodicities of the SS or SS blocks T1 and T2 for time t1 and time t2, respectively; bandwidths BW1 and BW2 and bandwidth centers BWC1 and BWC2 for the SS or SS blocks at times t1 and t2, respectively; and/or one or more characteristics C of a radio access node antenna configuration at times t1 and t2.

Certain embodiments of the disclosed embodiments may provide potential benefits compared to conventional techniques and technologies, such as greater flexibility in configuration of signals for wireless device synchronization, cell and beam identification, and improved adaptation of wireless device behavior and procedures to the flexible SS and SS blocks configuration.

More particularly, embodiments herein include a method of operating a wireless device in an NR wireless communications network. The method includes obtaining a numerology NUM of one or more synchronization signals (SS) or SS blocks at times t1 and t2; obtaining periodicities of the SS or SS blocks T1 and T2 for time t1 and time t2, respectively; obtaining bandwidths BW1 and BW2 and bandwidth centers BWC1 and BWC2 for the SS or SS blocks at times t1 and t2, respectively; determining one or more characteristics C of a radio access node antenna configuration at times t1 and t2; based on the NUM, T1, T2, BW1, BWC1, BW2, BWC2, and C, determine a time Tss associated with a measurement (e.g., measurement time, reporting time, etc.) of the SS or SS blocks received at t1 and t2. In certain embodiments, the method of operating the wireless device may be implemented in other radio nodes of a wireless communications network that are in need of synchronization.

In some embodiments, one or more of the NUM, T1, T2, BW1, BWC1, BW2, and BWC2 parameters is obtained based on at least one of: a pre-defined value, a pre-defined rule, and a message received from the network node. Furthermore, the one or more SS may be comprised in one or more corresponding SS blocks and the NUM, T1, T2, BW1, BWC1, BW2, and BWC2 parameters define a timing aspect of the one or more SS blocks.

In some embodiments, the NUM parameter is a subcarrier spacing parameter, a symbol length parameter, a slot length parameter, a CP length parameter, a number of subcarriers per resource block, a number of resource blocks with a given bandwidth, or a minislot length parameter.

In some embodiments, BW2 is determined from a rule defining BW2 as a function of BW1, N1, and N2, where N1 and N2 are sample length parameters corresponding to BW1 and BW2, respectively.

In some embodiments, the determined time Tss for one or more operational tasks, such as configuring the wireless device to receive the one or more SS for the measurement during the time Tss, combining samples received over the determined time Tss into a measurement result, determining a cell ID based on the one or more SS received during the time Tss, completing a synchronization procedure within the time Tss, completing the measurement or obtaining a result of the measurement within the time Tss, time stamping the result of the measurement within the time Tss, performing filtering of samples of the one or more SS adaptively based on the time Tss, refraining from changing an RF parameter of a receiver in the wireless device during time Tss, configuring the receiver to use the same set of receiver beams to receive the one or more SS during the time Tss, configuring layer 1 and/or layer 3 filtering adaptively based on the time Tss, determining, based on the time Tss, an amount of time relative to a time of measurement of the one or more SS within which to transmit an UL transmission in response to the measurement of the one or more SS, determining, based on the time Tss, an amount of time needed to acquire an UL transmission timing, indicating the time Tss to another node, and storing the time Tss for future use.

In some embodiments, Tss is a measurement time for obtaining a measurement of the one or more SS or a reporting time for reporting the measurement of the one or more SS.

In some embodiments, the wireless device determines whether the one or more SS are transmitted using beamformed or non-beamformed antenna based on the specific subframes corresponding to the time periods t1 and t2. Furthermore, the specific subframes may be determined based on symbol indices corresponding to the time periods t1 and t2.

Embodiments herein also include a method performed by network equipment, such as a network node, configured for use in an NR wireless communications network. The method comprises transmitting, during a first time period t1, at least a portion of one or more non-beamformed SS based on a first cell ID and transmitting, during a second time period t2, at least a portion of one or more beamformed SS based on the first cell ID. The method further comprises determining a time Tss for the network node to use in association with a measurement, made by the wireless device, of the one or more non-beamformed SS or the one or more beamformed SS.

In some embodiments, the time Tss may also be determined based on capability information obtained by the network node, the capability information characterizing a capability of a wireless device for receiving one or more non-beamformed SS and one or more beamformed SS.

In some embodiments, the time period t1 corresponds to a first set of resources R1 that are pre-defined for transmission of non-beamformed signals.

In some embodiments, the first set of resources R1 are further pre-defined for use with wireless devices in an IDLE state.

In some embodiments, a first set of resources R1 comprising the time period t1 does not overlap with a second set of resources R2 comprising the time period t2.

In some embodiments, a first set of resources R1 comprising the time period t1 at least partially overlap with a second set of resources R2 comprising the time period t2, and an antenna configuration used for a partially overlapping set of one or more resources to transmit the at least a portion of one or more non-beamformed SS is the same as an antenna configuration used for the partially overlapping set of one or more resources to transmit the at least a portion of one or more beamformed SS.

In some embodiments, the method performed by the network node further includes receiving, from the wireless device, a result of the measurement made by the wireless device, the time Tss being used to configure a waiting time for receiving the result.

Embodiments herein also include corresponding computer programs, carriers, and computer program products.

BRIEF DESCRIPTION OF THE DRAWINGS

The drawings illustrate selected embodiments of the disclosed subject matter. In the drawings, like reference labels denote like features.

Figure (FIG. 1 illustrates communication system according to an embodiment of the disclosed subject matter.

DETAILED DESCRIPTION

Figure 1:
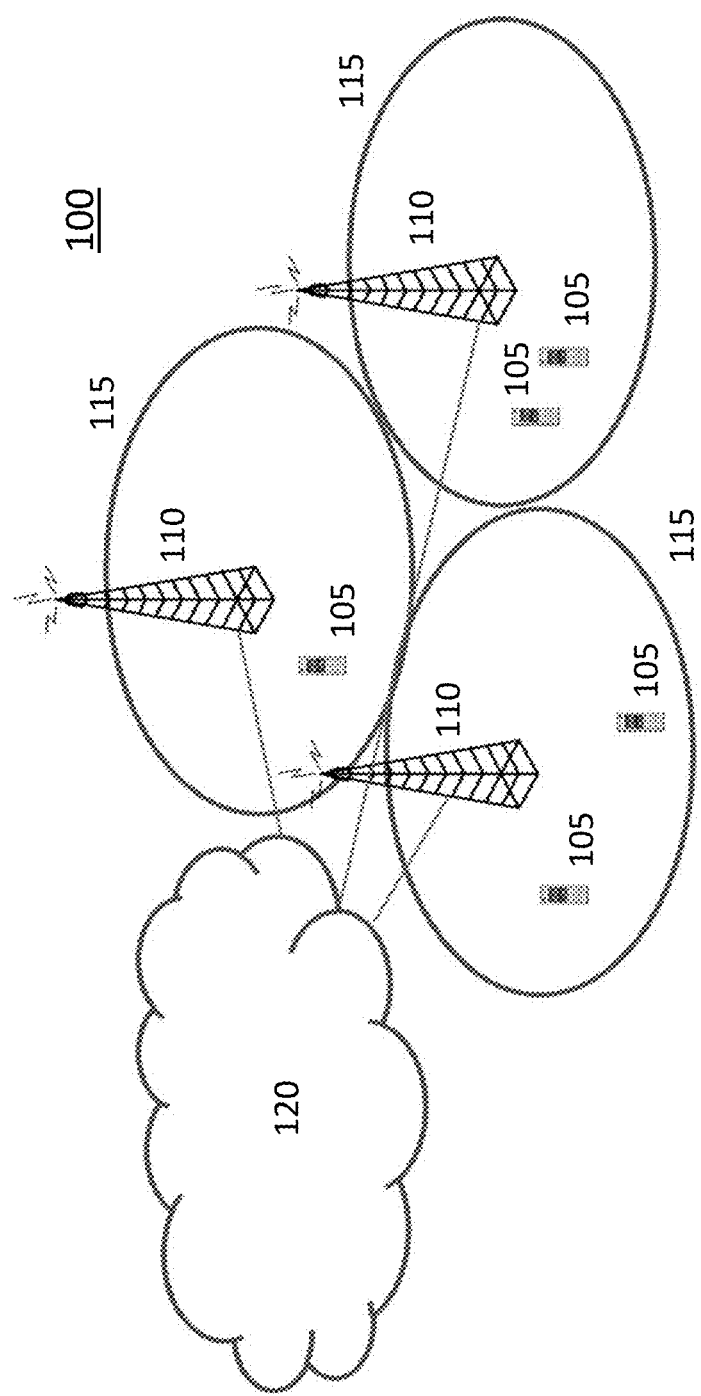

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

A. Terminology

Radio node: As used herein, a "radio node" is either a radio access node or a wireless device.

Radio access node: As used herein, a "radio access node" is any node in a radio access network of a wireless communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a gNB in an NR network), a high-power or macro base station, a low-power base station (e.g., a micro base station, a pico base station, a home eNB, or the like), and a relay node.

Core network node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless device: As used herein, a "wireless device" is any type of device that has access to (i.e., is served by) a wireless communications network by wirelessly transmitting and/or receiving signals to a radio access node(s). Some examples of a wireless device include, but are not limited to, a User Equipment device (UE) in a 3GPP network and a Machine Type Communication (MTC) device.

Network node: As used herein, a "network node" is a radio access node, core network node, or any other node that is either part of the radio access network or the CN of a wireless communications network/system that provides communication services to one or more wireless devices.

Carrier aggregation: The embodiments are applicable to single carrier as well as to multicarrier or carrier aggregation (CA) operation of the UE in which the UE is able to receive and/or transmit data to more than one serving cells. The term "carrier aggregation" (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

Signaling: The term "signaling" used herein refers to any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Time resource: The term "time resource" used herein refers to any type of physical resource or radio resource expressed in terms of length of time. Examples of time resources are: symbol, time slot, subframe, radio frame, TTI, interleaving time, etc.

Radio measurement: The term "radio measurement" (or, alternatively, "measurement") used herein refers to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, SSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, CQI, CSI, PMI, etc.), cell detection or cell identification, beam detection or beam identification, RLM, system information reading, etc.

Beamformed measurement: The term "beamformed measurement" or "radio beamformed measurement" used herein refers to any of the above radio measurements performed by a radio node on at least radio signals, which are transmitted by another radio node using at least one beam. The transmitted beam may be created by at least 2 transmit antennas or antenna elements. The beamformed measurement is also interchangeably called as a 'measurement with beamforming', a measurement on one or more beams, a beam measurement etc. The term beamformed measurement may further comprise performing the measurement using beamformed reception, i.e., using at least one reception beam. The beamformed measurement performed without measurement on the reception beam is denoted by Nb1. The beamformed measurement performed with reception beam is denoted by Nb2. For consistency a beamformed measurement is denoted by a generic term, 'Nb' and it can be Nb1 or Nb2.

Non-beamformed measurement: The term "non-beamformed measurement" or "radio non-beamformed measurement" used herein refers to any of the above radio measurements performed by a radio node on at least radio signals, which are transmitted by another radio node without any beam. The radio signal may be transmitted from the other radio node by using one or more transmit antennas. The radio signals are transmitted in the entire cell or at least in the part of the signal e.g. in the sector. The non-beamformed measurement is also interchangeably called as a 'measurement without beamforming', a measurement on omnidirectional signals or signals transmitted from omnidirectional or sectorized but not beamforming antennas, an omnidirectional measurement, sector measurement etc. The term non-beamformed measurement may further comprise performing the measurement using non-beamformed reception, i.e., without using any reception beam. The non-beamformed measurement performed without reception beam is denoted by Nn1. The term non-beamformed measurement may further comprise performing the measurement using beamformed reception, i.e., with using at least one reception beam. The non-beamformed measurement performed with reception beam is denoted by Nn2. For consistency non-beamformed measurement with or without reception beam is denoted by a generic notation, 'Nn' and it can be Nn1 or Nn2.

Measurement performance: The term "measurement performance" used herein refers to any criteria or metric which characterizes the performance of the measurement performed by a radio node. The term measurement performance is also called as measurement requirement, measurement performance requirements etc. Often a radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g. ideal measurement result) etc. Examples of measurement time are measurement period, cell identification period, evaluation period, etc.

Dynamic antenna configuration: The term "dynamic antenna configuration" refers to, e.g., an antenna configuration in which beams are switched or swept dynamically in the time domain. A dynamic antenna configuration may be at a UE and/or one or more radio access nodes. The dynamic configuration may apply to receive antennas and/or transmit antennas.

Numerology: The term "numerology" used herein refers to, e.g., any one or more of: subcarrier spacing, number of subcarriers per RB, CP length, number of RBs within the bandwidth, subframe length, etc. The numerology may be configured statically or change dynamically for transmissions from the same TP or cell and may or may not be the same for different cells and/or carrier frequencies.

Subset of beams: The term "subset of beams" used herein refers to a subset of beams or beam pairs which is smaller than the set of all beams or beam pairs associated with the cell. A beam or beam pair may comprise any one or more or a combination of any of: a DL transmission beam, an UL transmission beam, a DL reception beam, an UL reception beam. A beam may result from beam forming, beam sweeping, etc. The background section provides some example multi-antenna techniques in NR.

Non-beamformed SS or SS block: The term "non-beamformed SS or SS block" used herein refers to an SS (any signal or channel received and used by a radio node for performing synchronization, such as time and/or frequency synchronization and/or synchronization to a cell, initial access, cell or beam change, and/or cell identification) including an SS within one or more SS blocks, wherein the signals/channels are transmitted without beamforming (e.g., from a sectorized or omni directional antenna). Moreover, the signals/channels of a non-beamformed SS or SS block are cell-specific.

Beamformed SS or SS block: The term "beamformed SS or SS block" used herein refers to an SS or SS block, wherein the signals/channels are transmitted via a beam by the transmitting node and can be received and used by a radio node for performing synchronization (e.g., time and/or frequency synchronization, synchronization to a cell, or synchronization to a beam), initial access, cell or beam change, cell identification, and/or beam identification. The signals/channels of a beamformed SS or SS block may or may not be beam-specific but are cell-specific.

Bandwidth: The term "bandwidth" used herein refers to, for example, transmission bandwidth, reception, or measurement bandwidth. In some embodiments, a bandwidth may even be comprised of two or more sub-bandwidths, e.g., a first beam is transmitting in BW1 in t1 and t2 and a second beam is transmitting in BW2 in t1 (BW1 and BW2 have different center frequencies in this example), and BW1 and BW2 may be non-overlapping in frequency, so the total bandwidth BW comprises at least BW1 and BW2, which in one example may be staggered in frequency with or without another part of the frequency spectrum in between; for example, BW=BW1+BW2 in t1 and BW=BW1 in t2 and the total bandwidth BW changes (reduces) from t1 to t2. In yet another example, SS is transmitted from the same set of antennas over BW in t1 and over BW0<BW in t2, BW and BW0 may have the same center frequency.

Synchronization signals (SS): "Synchronization signals" or "synch signals" in an NR network are based on CP-OFDM. NR defines at least two types of synchronization signals: NR-PSS and NR-SSS. NR-PSS is defined at least for initial symbol boundary synchronization to the NR cell (the candidate numbers of PSS sequences are: 1, 2, 3, 4, and 6). NR-SSS is defined for detection of NR cell ID or at least part of NR cell ID. The number of NR cell IDs is targeted to be at least 504. NR-SSS detection is based on the fixed time/frequency relationship with NR-PSS resource position irrespective of duplex mode and beam operation type at least within a given frequency range and CP overhead. At least for single beam scenario, time division multiplexing of PSS and SSS is supported.

The raster for NR synchronization signals can be different per frequency range. At least for frequency ranges where NR supports a wider carrier bandwidth and operation in a wider frequency spectrum (e.g. above 6 GHz), the NR synchronization signals raster can be larger than the 100 kHz raster of LTE.

For initial access, UE can assume a signal corresponding to a specific subcarrier spacing of NR-PSS/SSS in a given frequency band given by specification.

For NR-PSS, ZC-sequence can be used as the baseline sequence for NR-PSS for study.

Synchronization signals bandwidth depends at least on the numerology (carrier spacing), but may also depend on carrier frequency and system bandwidth. For example:

For frequency range category #1 (below 6 GHz), where [15 kHz, 30 kHz, 60 kHz] are candidate subcarrier spacing values, candidate minimum NR carrier bandwidth are [5 MHz, 10 MHz, 20 MHz], and candidate transmission bandwidths of each synchronization signal are about [1.08 MHz, 2.16 MHz, 4.32 MHz, 8.64 MHz].

For frequency range category #2 (above 6 GHz), where [120 kHz, 240 kHz] are candidate subcarrier spacing values, candidate minimum NR carrier bandwidth are [20 MHz, 40 MHz, 80 MHz], and candidate transmission bandwidth of each synchronization signal are about [8.64 MHz, 17.28 MHz, 34.56 MHz, 69.12 MHz].

PBCH: At least one broadcast channel (NR-PBCH) is defined. NR-PBCH decoding is based on the fixed relationship with NR-PSS and/or NR-SSS resource position irrespective of duplex mode and beam operation type at least within a given frequency range and CP overhead. NR-PBCH is a non-scheduled broadcast channel carrying at least a part of minimum system information with fixed payload size and periodicity predefined in the specification depending on carrier frequency range. NR-PBCH contents shall include at least SFN (system frame number) and CRC. No blind detection of NR-PBCH transmission scheme or number of antenna ports is required by the UE. For NR-PBCH transmission, a single fixed number of antenna port(s) is supported. It's still open whether the numerology for NR-PBCH is the same as that for NR-PSS/SSS or not.

SS block: NR-PSS, NR-SSS and/or NR-PBCH are examples of SS and can be transmitted within an SS block. For a given frequency band, an SS block corresponds to N OFDM symbols based on the default subcarrier spacing, and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE.

In some embodiments, an SS block may even comprise one or more other reference signals, e.g., reference signals used for mobility.

SS burst: One or multiple SS block(s) compose an SS burst.

Figure 14:
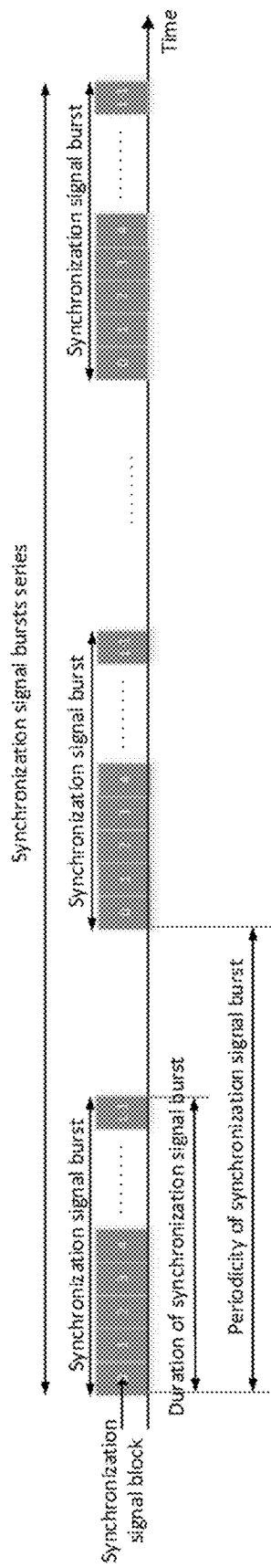
FIG. 14 illustrates an example configuration of SS blocks, SS bursts, and SS burst sets/series.

SS burst set: One or multiple SS burst(s) further compose an SS burst set (or series) where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency (e.g., one of 5 ms, 10 ms, 20 ms, 40 ms, 80 ms, or 100 ms). UE may assume that a given SS block is repeated with a SS burst set periodicity. By default, the UE may neither assume the gNB transmits the same number of physical beam(s), nor the same physical beam(s) across different SS-blocks within an SS burst set. An example configuration of SS blocks, SS bursts, and SS burst sets is illustrated in FIG. 14.

B. Methods in a Wireless Device

An example method of operation of a wireless device includes the following general steps, which are explained in further detail below. Although the steps are associated with numbers, the numbers are not intended to prescribe a particular order of the steps.

Step 1:

The wireless device obtains a numerology NUM of one or more SS or SS blocks at time t1 and t2, where time t2 differs from time t1 (the SS or SS blocks may in some examples belong to the same SS burst set).

Step 2:

The wireless device obtains periodicities of SS or SS blocks T1 and T2 for time t1 (to the next SS or SS block after t1) and time t2 (to the next SS or SS block after t2) respectively (e.g., T1 and T2 may or may not be the same; T2 may be different when e.g. the periodicity has changed or the SS/SS blocks at t1 and t2 belong to different burst sets).

Step 3:

The wireless device obtains bandwidth BW1 and bandwidth center BWC1 for one or more SS or SS blocks at time t1.

Step 4:

The wireless device obtains a bandwidth BW2, which differs from bandwidth BW1, and bandwidth center BWC2, which differs from bandwidth BWC1, for one or more SS or SS blocks at time t2 (t1 and t2 may be within the same or different SS blocks and/or SS bursts).

Step 5:

The wireless device determines one or more characteristics C of the antenna configurations in t1 and t2.

Step 6:

The wireless device determines a time Tss associated with a measurement (e.g., measurement time, reporting time, etc.) of the SS or SS blocks received at t1 and t2 based on numerology NUM, T1, T2, BW1, BWC1, BW2, BWC2, and C. Relations between any number of these parameters may also form a basis for the determination of Tss. The time Tss may be a measurement time, e.g., an amount of time in which a measurement is to be completed, or a reporting time, e.g. a time from when an SS measurement is triggered until a time when the measurement is reported.

Step 7:

The wireless device uses the determined time for one or more operational tasks.

In Step 1, the wireless device may obtain numerology NUM of one or more SS or SS blocks at time t1 and t2 (the SS or SS blocks may or may not in some examples belong to the same SS burst set). The obtaining may be based on a pre-defined value, pre-defined rule, a message received from another node (e.g., radio network node or controlling node), measurements (e.g., by testing two or more predefined hypotheses), etc. The numerology (e.g., subcarrier spacing and/or symbol or slot/minislot length) may be associated with or mapped from, e.g., one or more of: the carrier frequency or frequency band, type of cell, a time unit index number (e.g., subframe or slot number) of the SS(s) or SS block(s) in t1 or t2 (e.g., in subframe #0 a UE may assume a specific pre-defined numerology), system bandwidth, duplex mode (e.g., TDD, FDD, HD-FDD, flexible TDD, etc.), type of SS or SS block, wireless device's activity state (e.g., NUM1 may be assumed in IDLE, NUM2 may be assumed in CONNECTED), etc.

In Step 2, the wireless device may obtain periodicities of SS or SS blocks T1 and T2 for time t1 (to the next SS or SS block after t1) and time t2 (to the next SS or SS block after t2) respectively (e.g., T1 and T2 may or may not be the same; T2 may be different when e.g. the periodicity have changed or the SS/SS blocks at t1 and t2 belong to different burst sets). The obtaining may be based at least partially on one or more of a pre-defined value, pre-defined rule, a message received from another node (e.g., radio network node or controlling node), measurements (e.g., by testing two or more predefined hypotheses), etc. The periodicity may be associated with or mapped from, e.g., one or more of: the carrier frequency or frequency band, type of cell, numerology, system bandwidth, duplex mode (e.g., TDD, FDD, HD-FDD, flexible TDD, etc.), type of SS or SS block, wireless device's activity state (e.g., different periodicities may be pre-defined for IDLE and CONNECTED or INACTIVE state which is an intermediate state between IDLE and CONNECTED), etc.

In Step 3, the wireless device may obtain bandwidth BW1 and bandwidth center BWC1 for one or more SS or SS blocks at time t1. The obtaining may be based on a pre-defined value, pre-defined rule (e.g., BW1*T1=a pre-defined known value so based on T1 one can derive BW1 and vice versa, BW1 should not be larger than the system bandwidth), a message received from another node (e.g., radio network node or controlling node), measurements (e.g., by testing two or more predefined hypotheses), etc.

The BW1 and/or BWC1 may be associated with or mapped from, e.g., one or more of: the carrier frequency or frequency band, type of cell, numerology, system bandwidth, duplex mode (e.g., TDD, FDD, HD-FDD, flexible TDD, etc.), type of SS or SS block, periodicity T1, wireless device's activity state (e.g., different bandwidths may be pre-defined for IDLE and CONNECTED or INACTIVE), etc.

In Step 4, the wireless device may obtain bandwidth BW2 and bandwidth center BWC2 for one or more SS or SS blocks at time t2 (t1 and t2 may be within the same or different SS blocks and/or SS bursts). The obtaining may be at least partially based on one or more of a pre-defined value, pre-defined rule (e.g., BW2*T2=a pre-defined known value so based on T2 one can derive BW2 and vice versa, BW2 should not be larger than the system bandwidth), a message received from another node (e.g., radio network node or controlling node), measurements (e.g., by testing two or more predefined hypotheses), etc.

The BW2 and/or BWC2 may be associated with or mapped from, e.g., one or more of: the carrier frequency or frequency band, type of cell, numerology, system bandwidth, duplex mode (e.g., TDD, FDD, HD-FDD, flexible TDD, etc.), type of SS or SS block, periodicity T2, bandwidth BW1, wireless device's activity state (e.g., different bandwidths may be pre-defined for IDLE and CONNECTED or INACTIVE), etc.

In another example, BW2 may be determined from a rule that $N1*BW1=N2*BW2$ is constant and pre-defined, where N1 and N2 may be the number of samples or the sample length (e.g. symbol length depending on the numerology) for BW1 and BW2, respectively.

In yet another example, the wireless device further determines or adapts BW2 to be not larger than BW1 (even if the transmission bandwidth of SS or SS block at t2 is larger than BW1), e.g., to avoid bandwidth reconfigurations e.g. when this may cause any or some excessive interruptions to the wireless device's receptions or transmissions.

In Step 5, the wireless device may determine one or more characteristics C of the antenna configurations in t1 and t2 for transmitting SS or SS blocks. Examples of the characteristics may comprise, e.g., an indication of any one or more of:

whether the transmitting set of beams is the same (or similar) or different in t1 and t2, whether the measured set of transmitting beams is the same (or similar) or different in t1 and t2, whether the antenna configuration is beamformed in one or both of t1 and t2, whether the antenna configuration is non-beamformed in one or both of t1 and t2, whether the SS transmission(s) are from both beamformed and non-beamformed antenna in t1, whether the SS transmission(s) are from both beamformed and non-beamformed antenna in t2, whether the configuration (e.g., beam width, directional gain, etc.) of at least one of the beams is different in t1 and t2, whether the configuration (e.g., beam width, directional gain, etc.) of all beams transmitting SS or SS blocks is the same (or similar, e.g., when a configuration parameter changed by no more than a delta) in t1 and t2, whether the configuration (e.g., beam width, directional gain, etc.) of all beams transmitting the SS or SS blocks in the cell is the same (or similar, e.g., when a configuration parameter changed by no more than a delta) in t1 and t2, and whether the configuration (e.g., beam width, directional gain, etc.) of all beams transmitting SS or SS blocks which are received by the wireless device is the same (or similar, e.g., when a configuration parameter changed by no more than a delta) in t1 and t2.

In one example, the characteristic C may be pre-defined for a specific wireless device's activity state, e.g., for IDLE or INACTIVE. In another example, a UE may assume that SS or SS blocks transmissions are non-beamformed, provided one or more certain conditions are met, e.g., t1 and t2 are in specific subframes or SS blocks in t1 and t2 have specific indices. In yet another example, a UE may assume that SS or SS blocks transmissions are beamformed, provided one or more certain conditions are met, e.g., t1 and t2 are in specific subframes or SS blocks in t1 and t2 have specific indices. Depending on the characteristic C, the wireless device may further decide to adjust its own antenna configuration, e.g., a different receiving antenna configuration or receiving beam(s) may be used when the transmitting antennas are different at t1 and t2.

In Step 6, the wireless device, based on numerology NUM, T1, T2, BW1, BWC1, BW2, BWC2, and C, and/or the relation between any of these parameters, determines a time Tss associated with a measurement (e.g., measurement time, reporting time, etc.) which is based at least on the signals/channels received in t1 and t2. For example, time Tss may be determined according to any of the following functions:

Tss=f(NUM, T1, T2, BW1, BWC1, BW2, BWC2, C, and, optionally, K) or

Tss=f(NUM, max(T1, T2), BW1, BWC1, BW2, BWC2, C, and, optionally, K) or

Tss=f(NUM, T1, T2, min(BW1, BW2), BWC1, BWC2, C, and, optionally, K) or

Tss=f(NUM, T1/T2, BW1/BW2, BWC1, BWC2, C, and, optionally, K) or

Tss=f(NUM, T1*BW1, T2*BW2, BWC1, BWC2, C, and, optionally, K) or

Tss=f(NUM, N1*BW1, N2*BW2, BWC1, BWC2, C, and, optionally, K) or

Tss=f(NUM, N1*NBW1, N2*NBW2, BWC1, BWC2, C, and, optionally, K).

Tss may also depend, e.g., on the carrier frequency or frequency band which may be reflected in BWC1 and BWC2. In the above, N1 and N2 may be the number of samples or the sample length (e.g. symbol length depending on the numerology) for BW1 and BW2 respectively. In one further example, N1*BW1=N2*BW2 is constant and pre-defined. NBW1 and NBW2 may be the number of samples in frequency (e.g., depending on sampling rate or FFT size). It may be so that N1*NBW1=N2*NBW2 is constant a pre-defined.

Tss may also be a function of the number K of changes for the periodicity, bandwidth, and/or bandwidth centers that occur during a measurement period. In one example, a timer used to measure the measurement time Tss may need to be restarted from 0 upon a determined change, so in one embodiment Tss may scale with K or with min(K,k) where k (e.g., k=3) is the number of the maximum allowed scalings. Multiple changes (e.g., K>1) may comprise performing at least some of the steps Step 1-Step 5 more than once for two or more pairs of t1 and t2 (in one example, t1 and t2 may be consecutive but not necessarily adjacent in time, while in another example the wireless device may take the minimum of BW1 and BW2 even if there is t1 a with SS and SS blocks between t1 and t2). For example, when the transmission bandwidth at t1 is BW1, at t2 is BW2 (BW1<BW2), and at t3 is BW3 (BW2<BW3), the wireless device may determine Tss based on the minimum of BW1, BW2, and BW3.

When BWC1 and BWC2 are not the same or different by more than a threshold wherein the threshold may also depend on BW1 and BW2, an additional margin may be added compared to when BWC1 and BWC2 are the same. In another example, when BWC1 and BWC2 are not the same or different by more than a threshold wherein the threshold may also depend on BW1 and BW2, Tss may be r times longer compared to when they are the same. It may be that r=1 when BW1 and BW2 overlap in frequency, otherwise r>1.

In another example, Tss depend on subcarrier spacing, e.g., Tss may be longer for a shorter subcarrier spacing (e.g., with all other equal parameters at t1 and t2). In another example, a longer Tss may apply when C indicates a change in antenna configuration, especially if the UE has to determine blindly whether the change occurs or confirm at t1 and t2 that the same beam set if used. In another example, Tss may be determined based on the smallest common (between t1 and t2) antenna configuration subset (e.g., set or a subset of beams or transmitting antennas). In yet another example, Tss may be determined for the most pessimistic antenna configuration during t1 and t2 (e.g., for the lowest gain or smallest set of beams, etc.). In one further embodiment, Tss may be determined once for one measurement. In another embodiment, Tss may be dynamically determined during the measurement. In yet another embodiment, Tss may be updated (e.g., extended or shortened) one or more times during the measurement.

In one example embodiment, Tss may be a maximum of Tss t1 and Tss t2, where Tss t1 is N1*max(T1) or N1*max(T1, DRX cycle length) and Tss t2 is N2*max(T2) or N2*max(T2, DRX cycle length). The number of samples N1 and N2 can be looked up in a table and may depend on different bandwidths (BW1, BW2), subcarrier spacing, and/or frequency ranges (alternatively, N1 and/or N2 may be independent of the bandwidth). Moreover, the frequency ranges in NR may be associated with specific numerologies or numerology ranges, e.g., 15 kHz and 30 kHz for a first frequency range, FR1, and 120 kHz and 240 kHz for a second frequency range, FR2. Thus, a dependence on frequency range may also imply a dependence on numerology.

In Step 7, the UE may use the determined time Tss for one or more operational tasks including, e.g.:

configuring the receiver to receive SS or SS blocks for this measurement during the determined time Tss.

combining the samples received over the determined time Tss into a measurement result.

determining a cell ID based on SS or SS blocks received during Tss.

completing a synchronization procedure during no longer than Tss.

completing the measurement (obtain a result of the measurement) no later than Tss.

time stamping the result of the measurement no later than in the end of Tss.

performing filtering of the samples, adaptively to Tss.

refraining from changing an RF parameter (e.g., RF bandwidth) during Tss, at least on the same carrier.

configuring the receiver to use the same set of receiver beams to receive the SS or SS blocks during the entire Tss.

configuring L1 and/or L3 filtering, adaptively to Tss, e.g., filtering window size, filtering coefficient, etc.

determining the time for a related UL transmission (e.g., a RA message or ACK/NACK or report with a measurement result), which may be not later than the time Tss determined in the previous step.

determining the time needed to acquire UL transmission timing, which may be at least as large as the determined time Tss from the previous step.

indicating Tss to another node.

storing Tss, e.g., for statistics, history or future use.

C. Methods in a Network Node

An example method of operation of a network node (which may be a gNodeB or test equipment simulating a gNodeB) includes the following general steps, which are explained in further detail below. Although the steps are associated with numbers, the numbers are not intended to prescribe a particular order of the steps Step 0:

The network node obtains a wireless device's capability related to receiving an SS or SS block.

Step 1:

The network node determines the need to transmit a non-beamformed SS or SS block.

Step 2:

Upon the determined need, the network node transmits the non-beamformed SS or SS block (SS and one or more other signals/channels in the same block of time and/or frequency resources) based on a first cell ID in one or more time resources R1. In some embodiments, the radio access node indicates to the wireless device resources R1, implicitly or explicitly.

Step 3:

The network node determines the need to transmit a beamformed SS or SS block.

Step 4:

Upon the determined need, the radio access node transmits the beamformed SS or SS block based on the first cell ID in one or more resources R2, where R1 and R2 comprise t1 and t2, respectively, described above in section B. In some embodiments, the radio access node also indicates to the wireless device resources R2, implicitly or explicitly.

Step 5:

The network node determines for the wireless device a time Tss associated with a measurement (e.g., measurement time, reporting time, etc.) which is based at least on the signals/channels received in t1 and t2 comprised in R1 and R2.

Step 5a:

The network node determines numerology NUM used by the wireless device.

Step 5b:

The network node determines periodicities T1 and T2 used by the wireless device.

Step 5c:

The network node determines BW1, BWC1, BW2, BWC2 used by the wireless device.

Step 5d:

The network node determines characteristics C of the antenna configurations used by the radio access node in t1 and t2.

Step 6:

The network node receives from the wireless device a result related to receiving a non-beamformed and/or beamformed SS or SS block. In some embodiments, the network node also determines the type of SS or SS blocks used by the wireless device (e.g., non-beamformed, beamformed, or both) and/or, based on the determined type, performs one or more operations.

In Step 0, the wireless device's capability may be received from the wireless device or otherwise the radio access node may assume a minimum default wireless device capability related to SS or SS block reception, including measurement bandwidth, bandwidth center alignment in different SS blocks during the same measurement, supported periodicity, etc. In one example, the capability may be different for wireless devices in different activity states, e.g., in IDLE or CONNECTED.

In one example of Steps 1 and 2, the network node may always transmit non-beam formed SS and SS blocks in a pre-defined set of resources R1 to be used for non-beamformed transmissions. In some examples, non-beamformed transmissions may be used at least by IDLE wireless devices. R1 may be communicated to the wireless device in broadcast, multicast or dedicated signaling.

In one example of Steps 3 and 4, the network node may transmit beamformed SS or SS blocks in R2 which do not overlap with R1. In another example, the radio access node may transmit beamformed SS or SS blocks in R2 which fully or at least partly overlap with R1, provided the same antenna/beam configurations are used in the overlapping resources. In yet another example, the network node may transmit beamformed SS or SS blocks upon determining at least one wireless device in a non-IDLE state is under its coverage. R2 may be communicated to the wireless device in broadcast, multicast or dedicated signaling.

In Steps 5a-5c, principles and rules for determining Tss may be similar to those described above for the wireless device in section B. Determining of NUM, T1, T2, BW1, BW2, BWC1, BWC2, or number of changes may be based at least partially on one or more of a pre-defined value, rule, or own configuration.

With regards to Step 6, to receive the result, the network node may use the determined Tss, e.g., to configure the waiting time for the result, adapting UL scheduling for the wireless device's transmission, etc. The wireless device may obtain the result according to the description in section B above of step 7. The network node may receive the result in a message from the wireless device.

The message may also indicate the type of SS or SS blocks used by the wireless device (e.g., non-beamformed, beamformed, or both). This information may also be used by the network node to further adapt its transmissions of non-beamformed and/or beamformed SS or SS blocks transmissions (e.g., to decide whether to transmit or not).

Some non-limiting examples of the network node operations include:

SS or SS block transmission configuration, mobility or cell change assistance to the wireless device, configuring one or more intra- or inter-frequency measurements for the wireless device (e.g., for RRM, mobility, beam management, positioning, SON, etc.), adapting UE DL and/or UL scheduling, (re)configuring a set of serving cells for the wireless device, configuring one or more wireless device's specific beams for transmitting to or receiving from the wireless device, and configuring one or more transmission to the wireless device.

The described embodiments may be implemented in any appropriate type of communication system supporting any suitable communication standards and using any suitable components. As one example, certain embodiments may be implemented in a communication system such as that illustrated in FIG. 1. Although certain embodiments are described with respect to NR systems and related terminology, the disclosed concepts are not limited to NR or a 3GPP system. Additionally, although reference may be made to the term "cell", the described concepts may also apply in other contexts, such as beams used in Fifth Generation (5G) systems, for instance.

D. Further Description of Hardware and Software Embodiments

Referring to FIG. 1, a communication system 100 comprises a plurality of wireless communication devices 105 (e.g., UEs, machine type communication [MTC]/machine-to-machine [M2M] UEs) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 11:
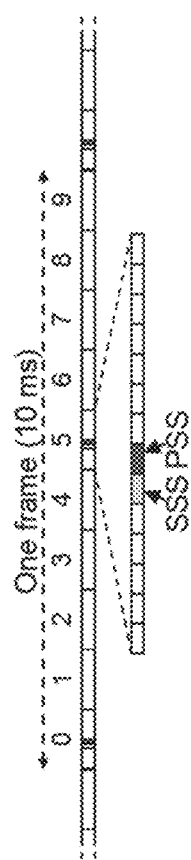
FIG. 11 illustrates the location of synchronization signals in LTE format.

Although wireless communication devices 105 may represent communication devices that include any suitable combination of hardware and/or software, these wireless communication devices may, in certain embodiments, represent devices such as those illustrated in greater detail by FIGS. 11A and 11B. Similarly, although the illustrated radio access node may represent radio access nodes that include any suitable combination of hardware and/or software, these nodes may, in particular embodiments, represent devices such those illustrated in greater detail by FIGS. 12A, 12B and 13.

Figure 2B:
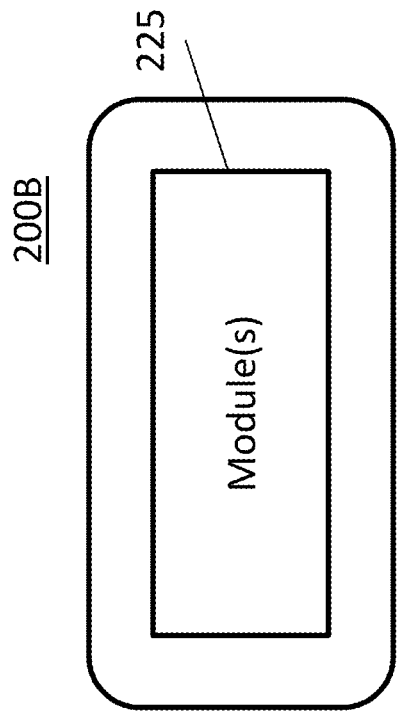
FIG. 2B illustrates a wireless communication device according to another embodiment of the disclosed subject matter.
Figure 2A:
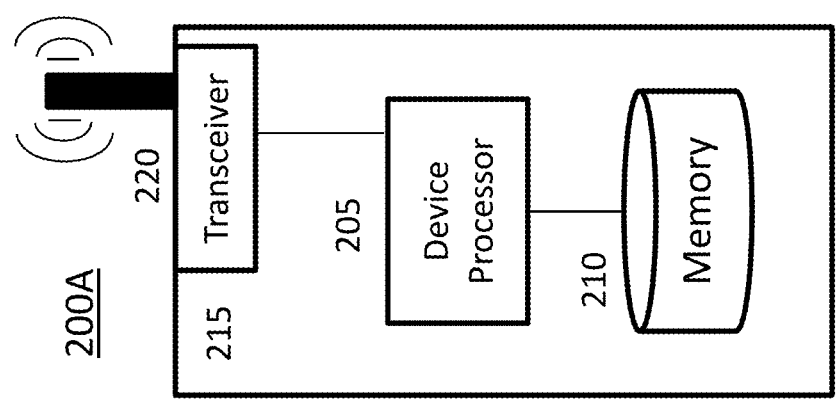
FIG. 2A illustrates a wireless communication device according to an embodiment of the disclosed subject matter.

Referring to FIG. 2A, a wireless communication device 200A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as memory 210. Alternative embodiments may include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 2A.

Figures 3A, 3B:
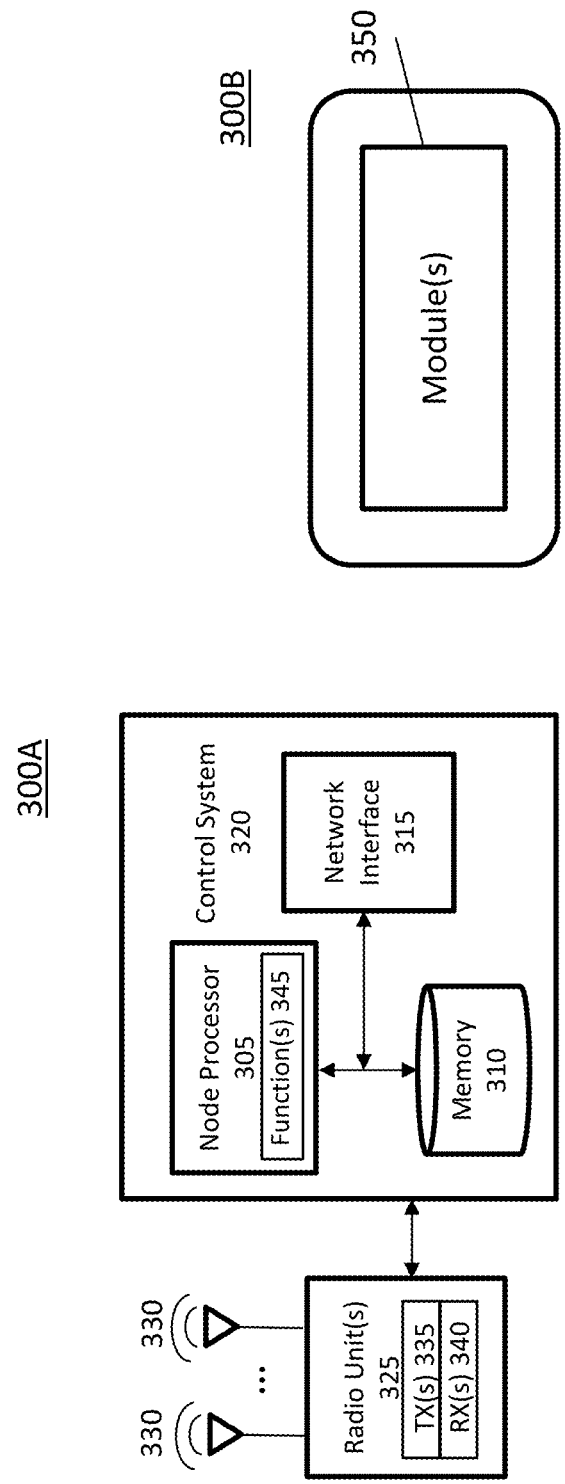
FIG. 3A illustrates a radio access node according to an embodiment of the disclosed subject matter.
FIG. 3B illustrates a radio access node according to another embodiment of the disclosed subject matter.

Referring to FIG. 3A, a radio access node 300A comprises a control system 320 that comprises a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

Figure 12:
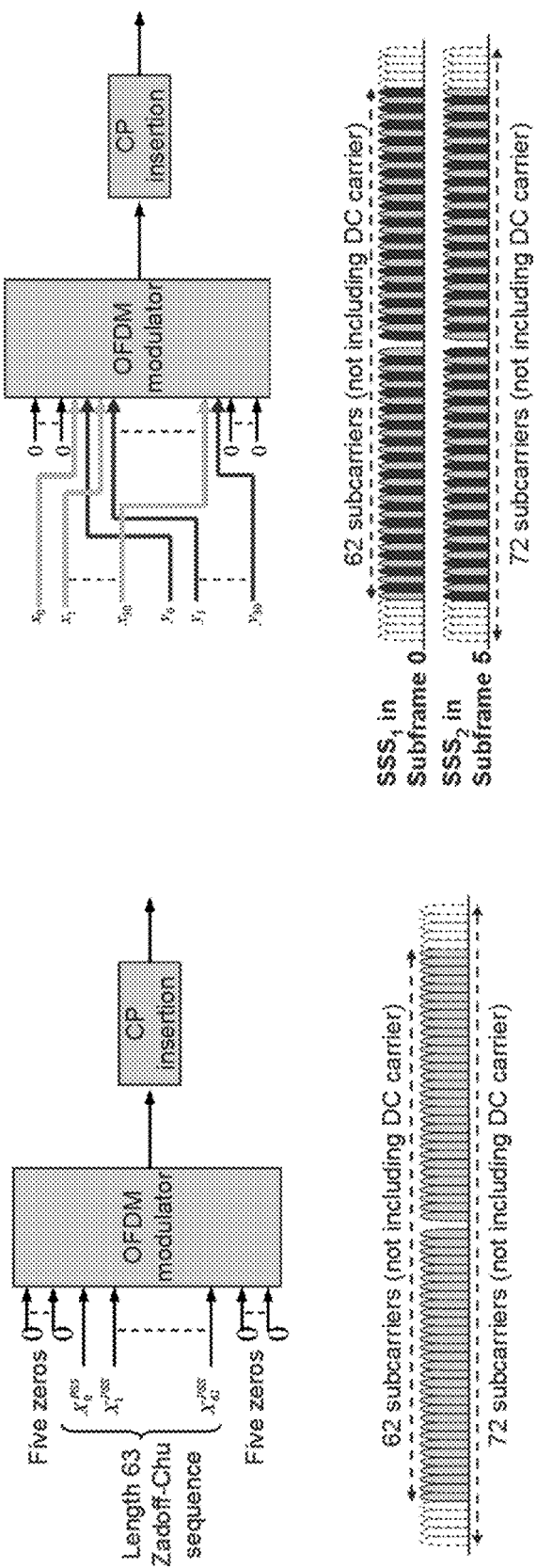
FIG. 12 illustrates synchronization signal content and resource element mapping.
Figure 13:
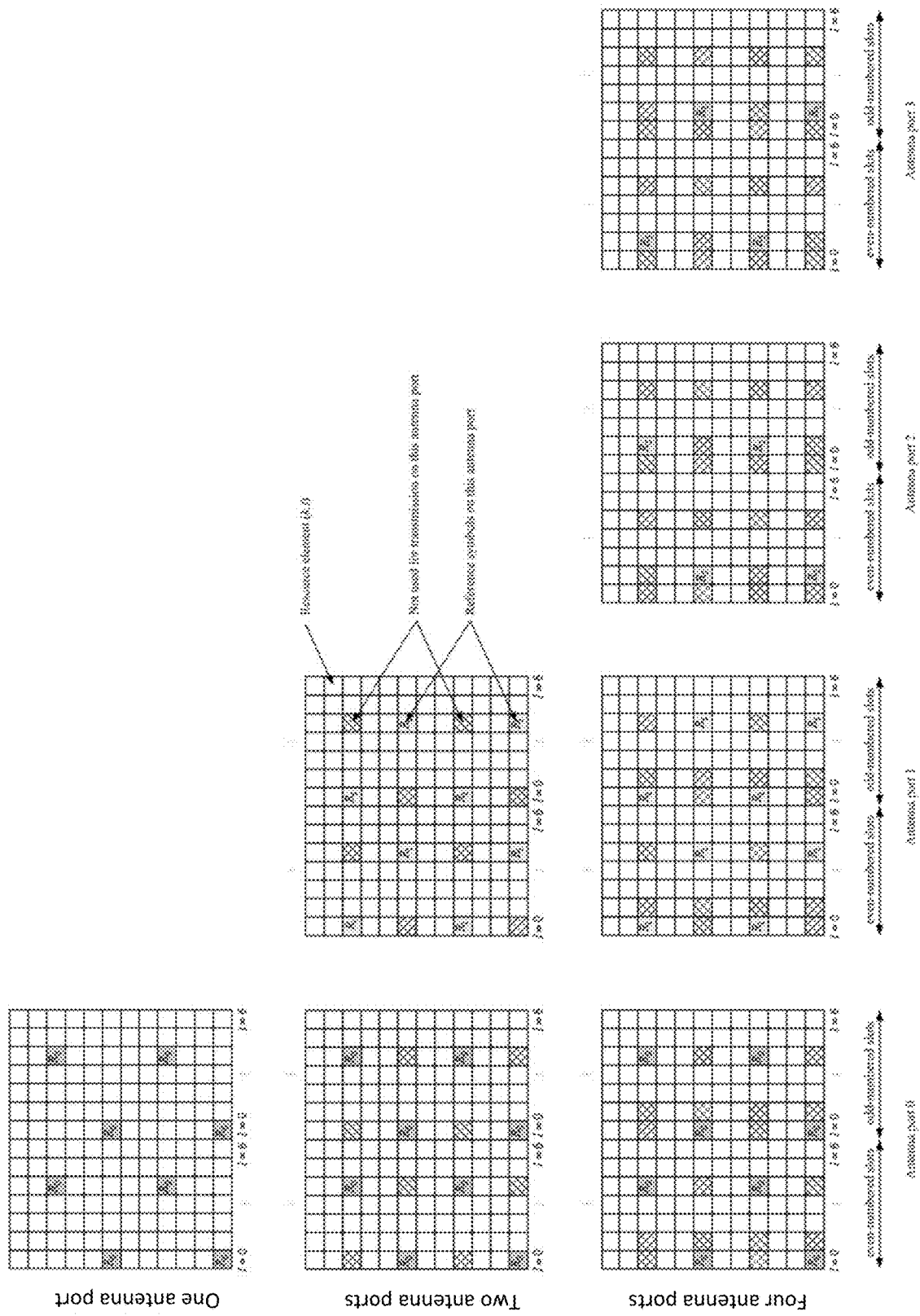
FIG. 13 illustrates cell-specific reference signals resource element mapping.

In certain embodiments, some or all of the functionality described as being provided by a base station, a node B, an enodeB, and/or any other type of radio access node may be provided by node processor 305 executing instructions stored on a computer-readable medium, such as memory 310 shown in FIG. 12A. Alternative embodiments of radio access node 300 may comprise additional components to provide additional functionality, such as the functionality described herein and/or related supporting functionality.

Referring to FIG. 3B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 12A.

Figure 4:
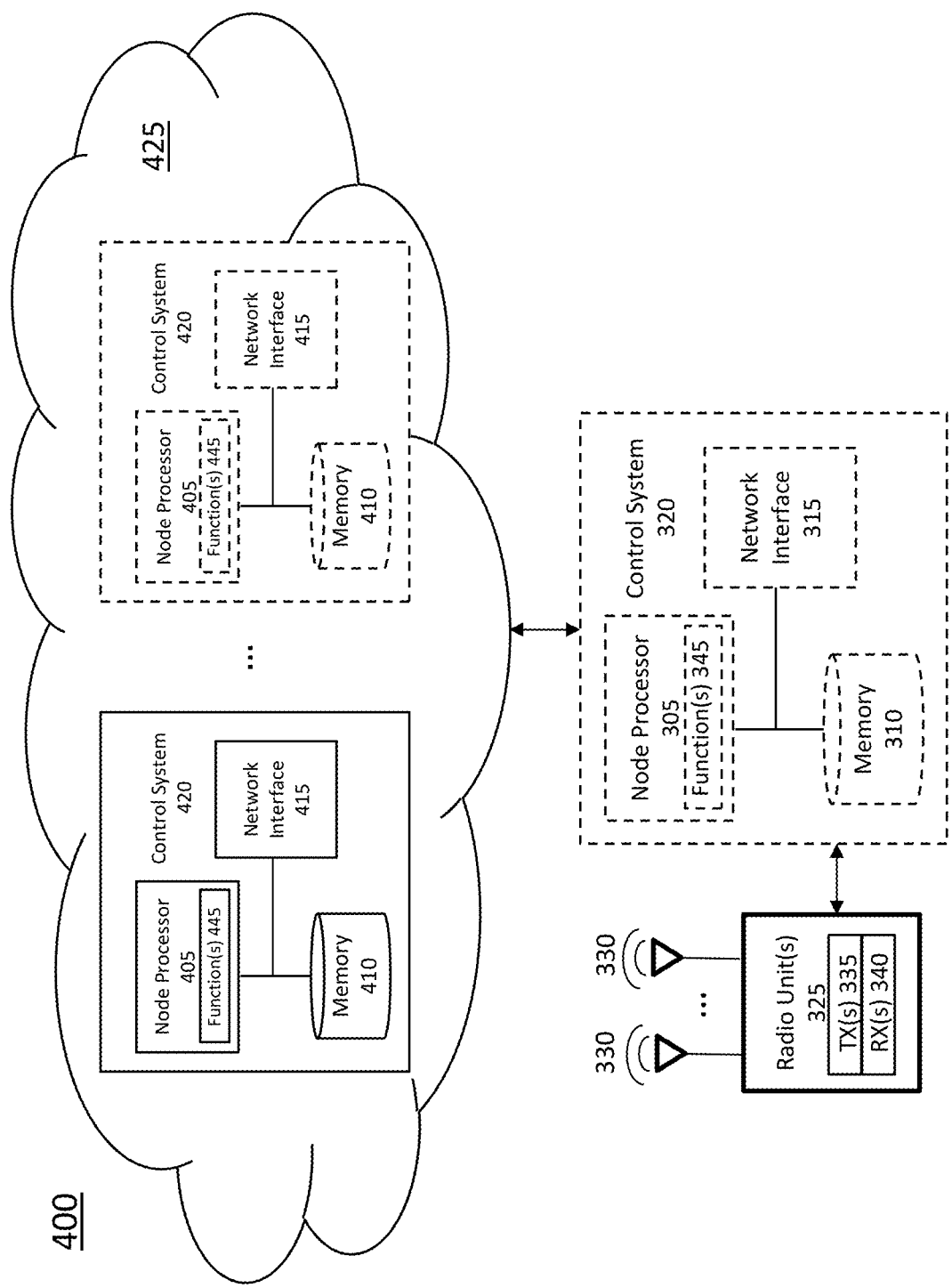
FIG. 4 illustrates a radio access node according to yet another embodiment of the disclosed subject matter.
Figure 5:
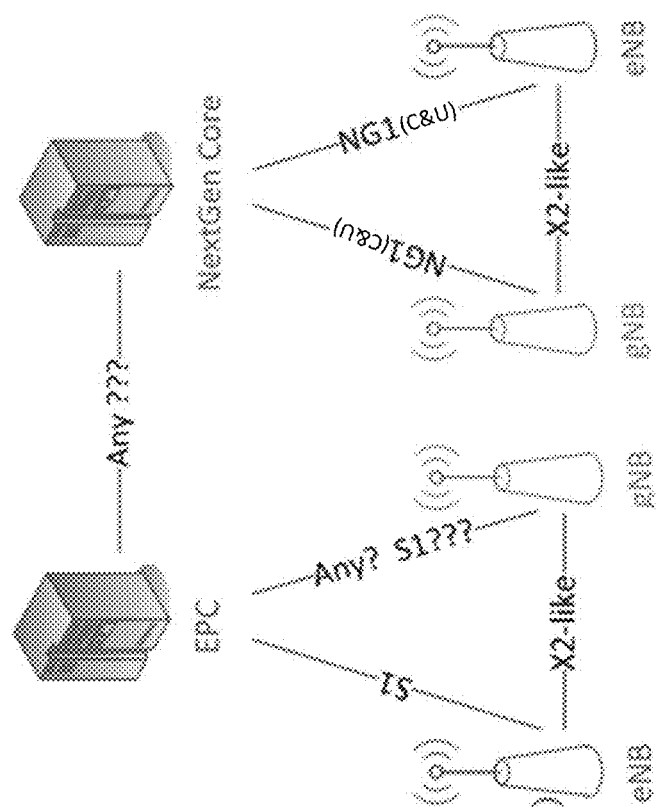
FIG. 5 illustrates a current NR network architecture.
Figure 6:
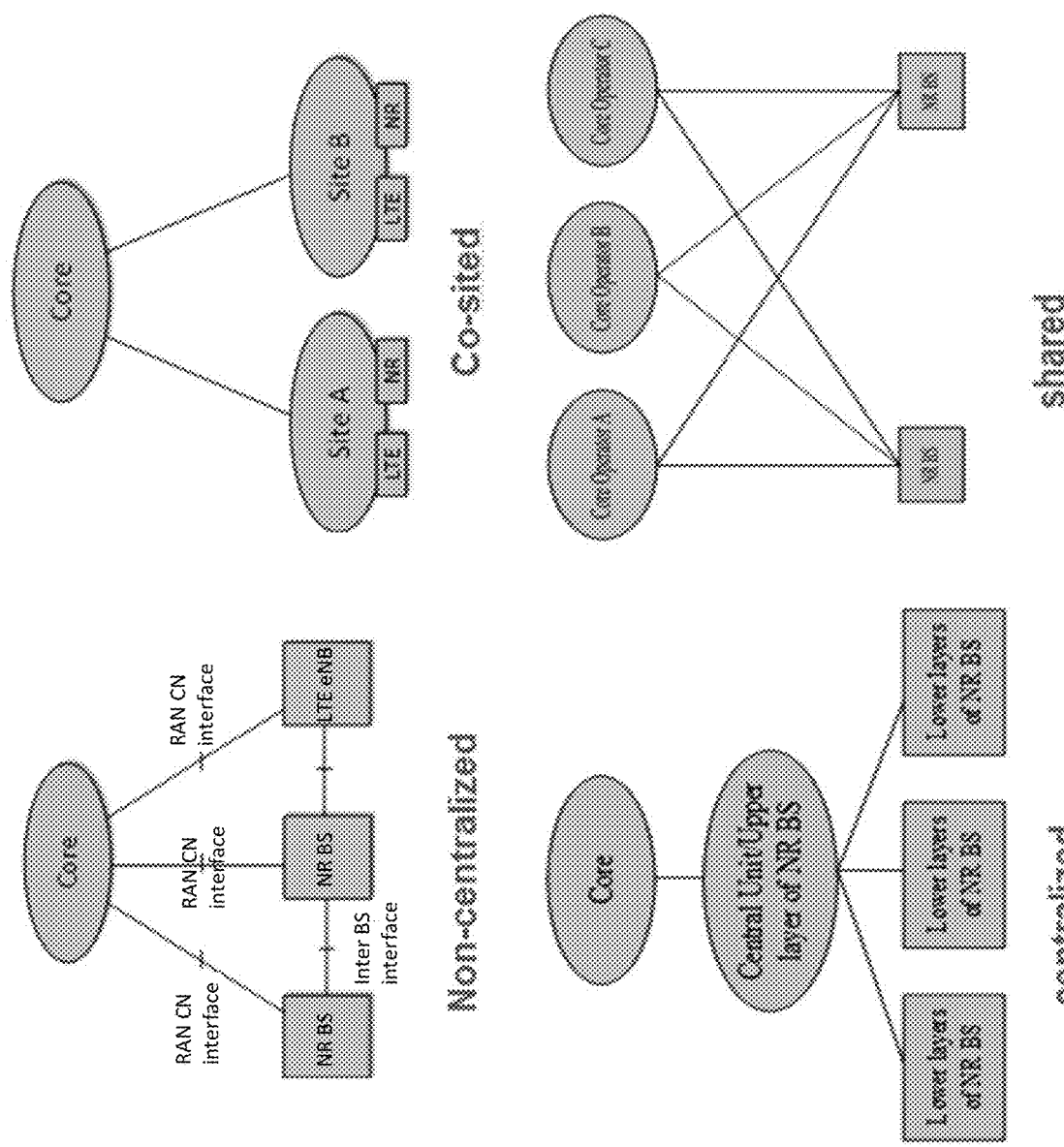
FIG. 6 illustrates various NR deployment examples.
Figure 7:
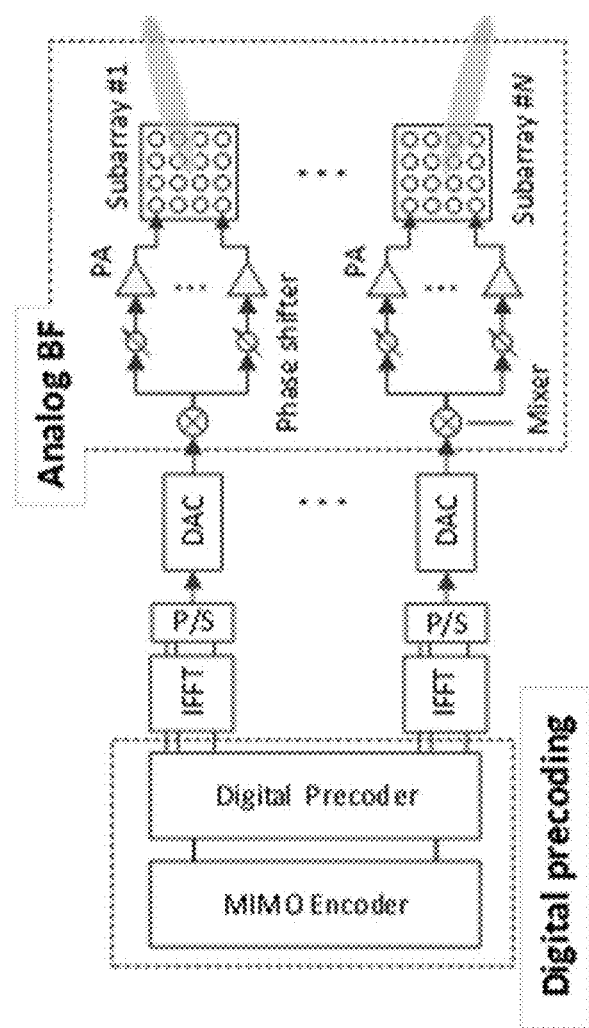
FIG. 7 illustrates an example of hybrid beamforming.
Figure 8:
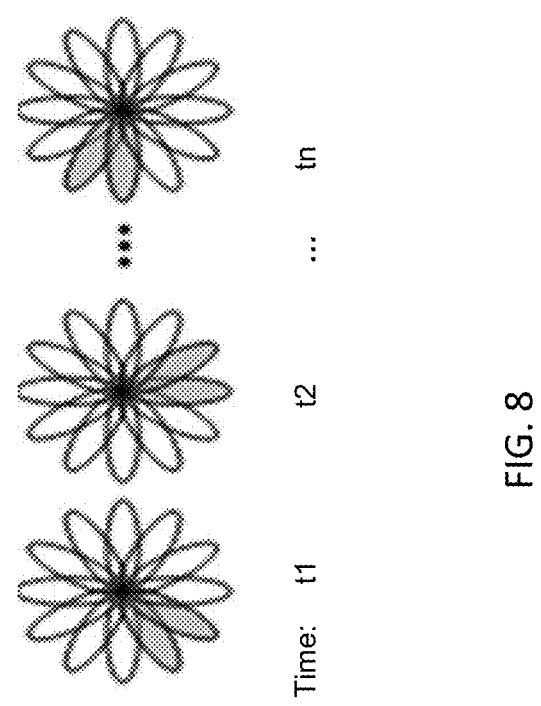
FIG. 8 illustrates a transfer beam sweeping on two subarrays.
Figure 9:
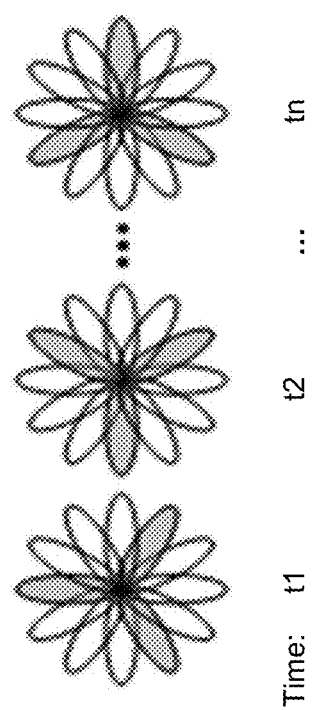
FIG. 9 illustrates a transfer beam sweeping on three subarrays.
Figure 10:
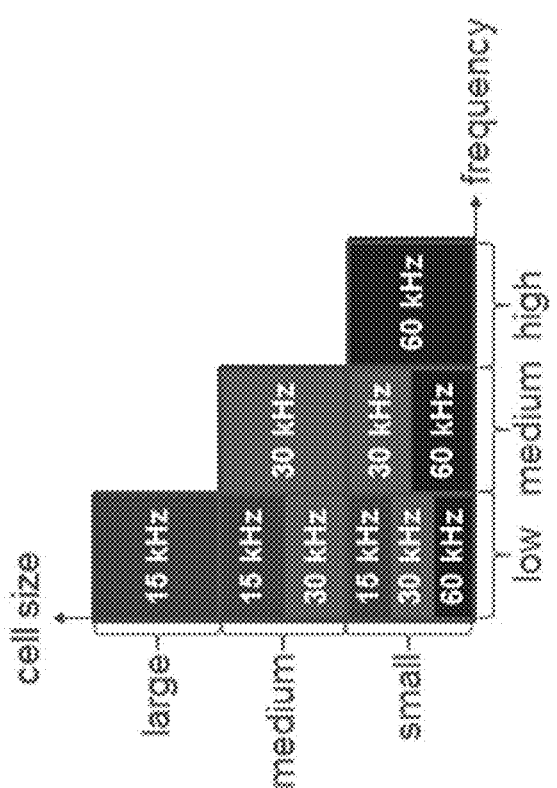
FIG. 10 illustrates an example of subcarrier spacing candidate configurations for NR.

FIG. 4 is a block diagram that illustrates a virtualized radio access node 400 according to an embodiment of the disclosed subject matter. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described in relation to FIG. 3A.

Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program comprises instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein.

Figure 15:
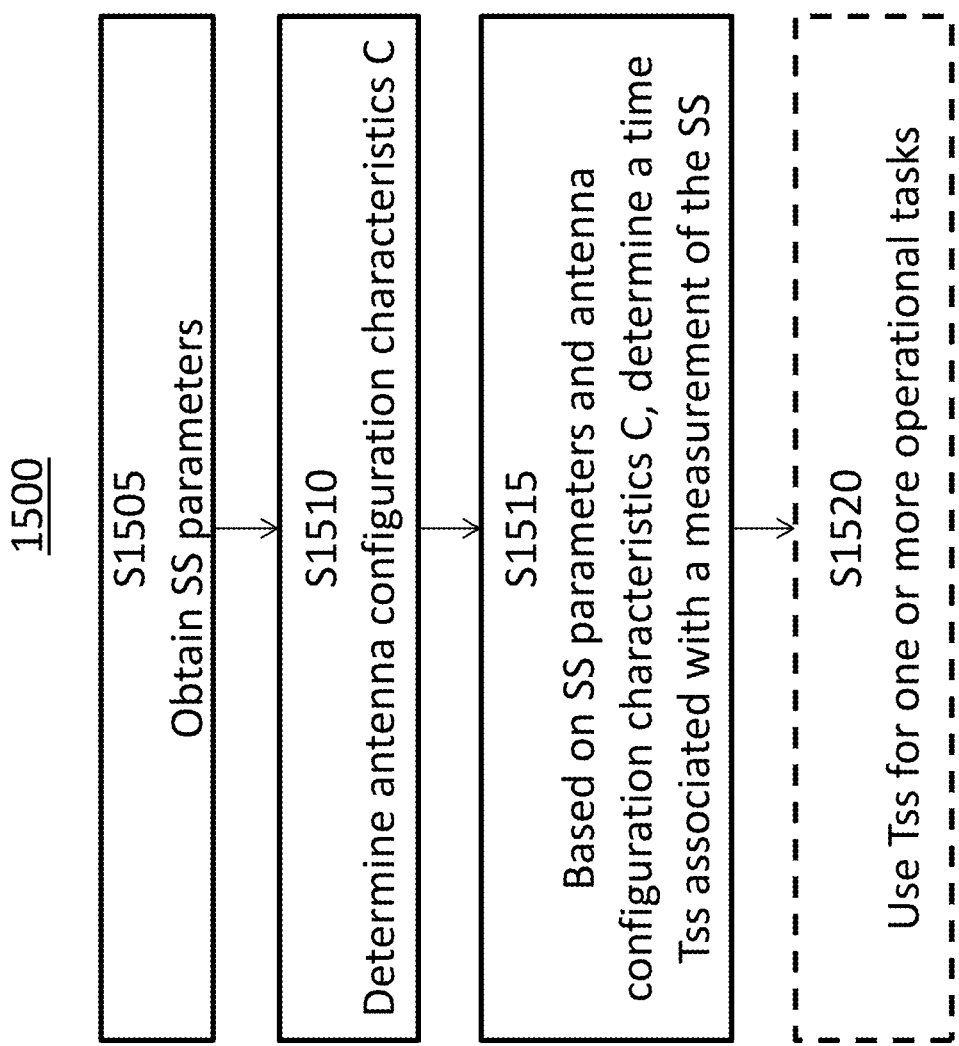
FIG. 15 illustrates a flowchart of an example method of operation of a wireless device.

FIG. 15 is a flowchart illustrating a method 1500 of operation of a wireless device (e.g., wireless device 105). The method 1500 comprises a step S1505 in which the wireless device obtains various SS parameters, including a numerology NUM of one or more synchronization signals (SS) or SS blocks at times t1 and t2 and obtains periodicities T1, T2, bandwidths BW1, BW2, and bandwidth centers BWC1, BWC2 of the one or more SS or SS blocks at times t1 and t2, respectively. The method step S1505 may be performed in accordance with steps 1, 2, 3, and 4 described in section B above. The method 1500 further comprises a step S1510 of determining one or more characteristics C of an antenna configuration of a radio access node transmitting the one or more SS or SS blocks at times t1 and t2. Step S1510 may be performed in accordance with the description above of step 5 described in section B above. The method 1500 further comprises a step S1515 of, based on the NUM, T1, T2, BW1, BWC1, BW2, BWC2, and C, determining a time Tss associated with a measurement of the SS or SS blocks received at t1 and t2. Step S1515 may be performed in accordance with the description above of step 6 described in section B above. The method 1500, or portions thereof, may also be adapted for implementation in another radio node that needs synchronization.

The method 1500 may further comprise an optional step S1520 of using the determined time Tss for one or more operational tasks. The tasks may include, for example, configuring the wireless device to receive the one or more SS for the measurement during the time Tss, combining samples received over the determined time Tss into a measurement result, determining a cell ID based on the one or more SS received during the time Tss, completing a synchronization procedure within the time Tss, completing the measurement or obtaining a result of the measurement within the time Tss, time stamping the result of the measurement within the time Tss, performing filtering of samples of the one or more SS adaptively based on the time Tss, avoiding changing or refraining from changing an RF parameter of a receiver in the wireless device during time Tss, configuring the receiver to use the same set of receiver beams to receive the one or more SS during the time Tss, configuring layer 1 and/or layer 3 filtering adaptively based on the time Tss, determining, based on the time Tss, an amount of time relative to a time of measurement of the one or more SS within which to transmit an UL transmission in response to the measurement of the one or more SS, determining, based on the time Tss, an amount of time needed to acquire an UL transmission timing, indicating the time Tss to another node, and storing the time Tss for future use.

Figure 16:
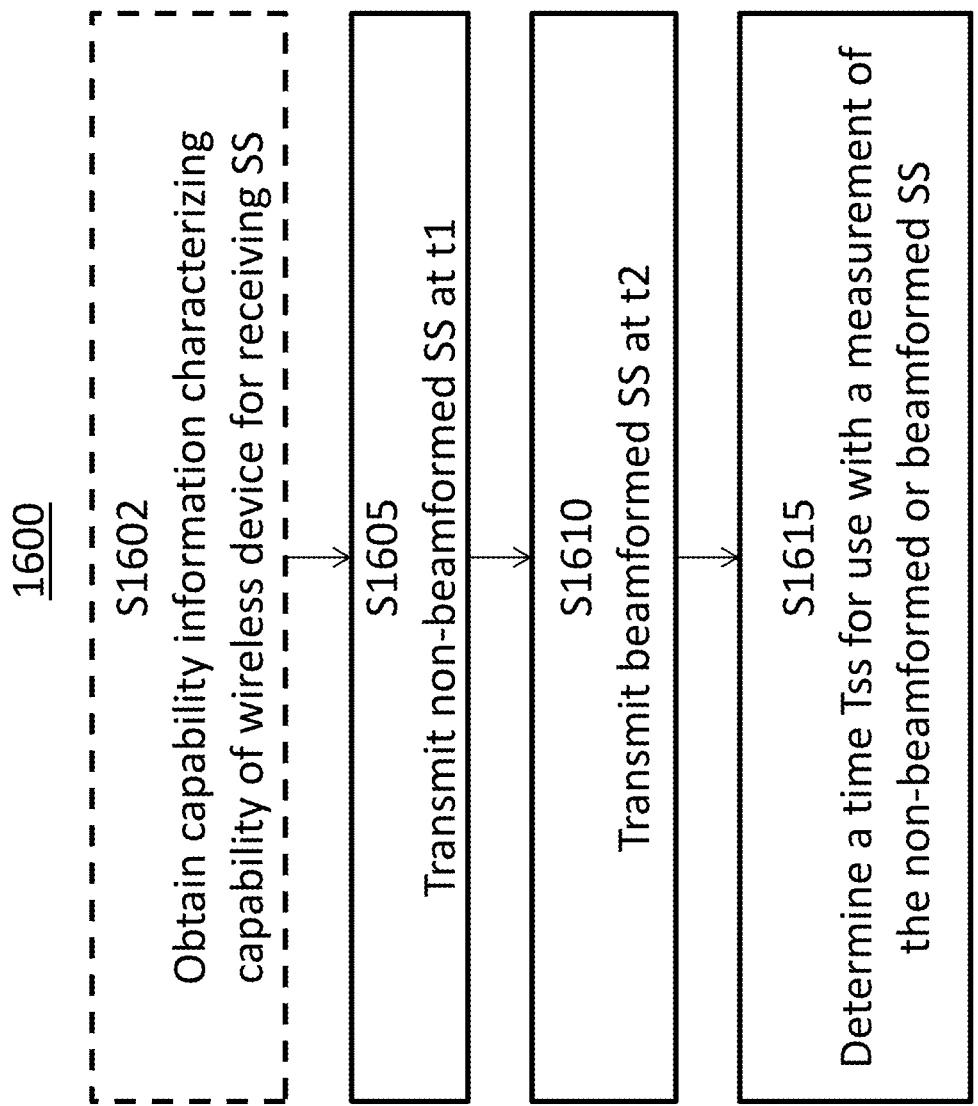
FIG. 16 illustrates a flowchart of an example method of operation of a network node.

FIG. 16 is a flowchart illustrating a method 1600 of operation of a network node (e.g., radio access node 110). The method 1600 comprises an optional step S1602 in which the network node obtains wireless device obtains capability information that characterizes a capability of a wireless device for receiving one or more non-beamformed SS and one or more beamformed SS. The method 1600 further comprises a step S1605 of transmitting, during a first time period t1, at least a portion of one or more non-beamformed SS based on a first cell ID and a step S1610 of transmitting, during a second time period t2, at least a portion of one or more beamformed SS based on the first cell ID. Step S1605 may be performed in accordance with the description above of steps 1 and 2 described in section C above and step S1610 may be performed in accordance with the description above of steps 3 and 4 of section C above. The method 1600 further comprises a step S1615 of determining a time Tss for the network node to use in association with a measurement, made by the wireless device, of the one or more non-beamformed SS or the one or more beamformed SS. the time Tss may also be determined based on the capability information obtained in step S1602. Step S1615 may be performed in accordance with the description above of step 5 described in section C above.

In one embodiment of method 1600, the time period t1 corresponds to a first set of resources R1 that are pre-defined for transmission of non-beamformed signals and the first set of resources R1 may further be pre-defined for use with wireless devices in an IDLE state.

In one embodiment, the first set of resources R1 comprising the time period t1 does not overlap with a second set of resources R2 comprising the time period t2. In other embodiments, the first set of resources R1 comprising the time period t1 at least partially overlap with the second set of resources R2 comprising the time period t2 and an antenna configuration used for a partially overlapping set of one or more resources to transmit the non-beamformed SS is the same as an antenna configuration used for the partially overlapping set of one or more resources to transmit the beamformed SS.

The method 1600 may also include a step (not shown) of receiving a result of the measurement made by the wireless device, the time Tss being used to configure a waiting time for receiving the result.

While the disclosed subject matter has been presented above with reference to various embodiments, it will be understood that various changes in form and details may be made to the described embodiments without departing from the overall scope of the disclosed subject matter. For example, although the methods described herein contain a series of steps presented in a particular order, the order may vary. Moreover, additional steps may be added or certain steps may be omitted as optional.

Those skilled in the art will also appreciate that embodiments herein further include corresponding computer programs.

A computer program comprises instructions which, when executed on at least one processor of a wireless device 105 (or radio access node 110), cause the wireless device 105 (or radio access node 110) to carry out any of the respective processing described above. A computer program in this regard may comprise one or more code modules corresponding to the means or units described above.

In other embodiments, computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing any of these computer programs. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of the wireless device 105 (or radio access node 110), cause the wireless device 105 (or radio access node 110) to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of operating a wireless device in a wireless communications network, the method comprising:
obtaining:

a numerology parameter NUM used by a network node to transmit at least a portion of one or more synchronization signals (SS) during a first time period, t1, and a second time period, t2, periodicity parameters T1 and T2 of the one or more SS transmitted during the first and second time periods, t1 and t2, respectively, and bandwidth parameters BW1 and BW2 and bandwidth center parameters BWC1 and BWC2 for the one or more SS during the first and second time periods, t1 and t2, respectively;

determining one or more antenna configuration characteristics C of the network node operable to transmit the at least a portion of the one or more SS during the first and second time periods t1 and t2; and based on the NUM, T1, T2, BW1, BWC1, BW2, and BWC2 parameters and the one or more C characteristics, determining a time Tss associated with a measurement of the one or more SS.

2. The method of claim 1, wherein one or more of the NUM, T1, T2, BW1, BWC1, BW2, and BWC2 parameters is obtained based on at least one of: a pre-defined value, a pre-defined rule, and a message received from the network node.

3. The method of claim 1, wherein the one or more SS are comprised in one or more corresponding SS blocks and the NUM, T1, T2, BW1, BWC1, BW2, and BWC2 parameters define a timing aspect of the one or more SS blocks.

4. The method of claim 1, wherein one or more of the NUM, T1, T2, BW1, BWC1, BW2, and BWC2 parameters is obtained based on one or more of:
a carrier frequency of the one or more SS,
a frequency band of the one or more SS,
a type of cell in which the wireless device is operating,
a time unit index number of the one or more SS,
a system bandwidth configured for the network node,
a duplexing mode configured for the wireless device, and
an activity state of the network node.

5. The method of claim 1, wherein the NUM parameter is a subcarrier spacing parameter, a symbol length parameter, a slot length parameter, a Cyclic Prefix (CP) length parameter, a number of subcarriers per resource block, a number of resource blocks with a given bandwidth, or a minislot length parameter.

6. The method of claim 1, wherein BW2 is determined from a rule defining BW2 as a function of BW1, N1, and N2, where N1 and N2 are sample length parameters corresponding to BW1 and BW2, respectively.

7. The method of claim 1, wherein Tss is a measurement time for obtaining a measurement of the one or more SS or a reporting time for reporting the measurement of the one or more SS.

8. The method of claim 1, wherein the one or more antenna configuration characteristics C are determined based on an indication of one or more of:
an activity state of the wireless device,
if a set of beams used to transmit the one or more SS during time period t1 substantially differs from another set of beams used during time period t2,
if a measured set of beams used to transmit the one or more SS during time period t1 substantially differs from another measured set of beams used during time period t2,
if, during one or both of time periods t1 and t2, an antenna configuration of the network node is beamformed,
if, during both of time periods t1 and t2, an antenna configuration of the network node is non-beamformed but the antenna configuration of the network node during time period t1 differs from the antenna configuration of the network node during time period t2,
if, during both of time periods t1 and t2, an antenna configuration of the network node is beamformed but the antenna configuration of the network node during time period t1 differs from the antenna configuration of the network node during time period t2,
if the antenna configuration during time period t1 is the same as the antenna configuration during time period t2 and the one or more SS are transmitted from both beamformed and non-beamformed antenna during time period t1,
if the antenna configuration during time period t1 is the same as the antenna configuration during time period t2 and the one or more SS are transmitted from both beamformed and non-beamformed antenna during time period t2,
whether a configuration of at least one of the beams in the set of beams used to transmit the one or more SS during time period t1 substantially differs from a configuration of at least one of the beams of the set of beams used to transmit the one or more SS during time period t2,
whether a configuration of all of the beams in the set of beams used to transmit the one or more SS during time period t1 substantially differs from a configuration of all of the beams in the set of beams used to transmit the one or more SS during time period t2,
whether a configuration of all of the beams in the set of beams used to transmit the one or more SS in a cell serving the wireless device during time period t1 substantially differs from a configuration of all of the beams in the set of beams used to transmit the one or more SS in the cell during time period t2,
whether a configuration of all of the beams in the set of beams used to transmit the one or more SS that are received by the wireless device during time period t1 substantially differs from a configuration of all of the beams in the set of beams used to transmit the one or more SS that are received by the wireless device during time period t2,
the specific subframes corresponding to the time periods t1 and t2.

9. The method of claim 8, wherein the wireless device determines whether the one or more SS are transmitted using beamformed or non-beamformed antenna based on the specific subframes corresponding to the time periods t1 and t2.

10. The method of claim 9, wherein the specific subframes are determined based on symbol indices corresponding to the time periods t1 and t2.

11. The method of claim 1, wherein Tss is determined based on one of:
a maximum function of T1 and T2,
a minimum function of BW1 and BW2,
a ratio of T1 to T2,
a ratio of BW1 to BW2,
a product of T1 and BW1 and a product of T2 and BW2,
a product of N1 and BW1 and a product of N2 and BW2, where N1 and N2 are sample length parameters corresponding to BW1 and BW2, respectively, or
a product of N1 and NBW1 and a product of N2 and NBW2, where NBW1 and NBW2 are frequency domain sample number parameters corresponding to BW1 and BW2, respectively.

12. The method of claim 1, wherein Tss is a function of a number K of times over a period of time that one or more of the T1, T2, BW1, BWC1, BW2, and BWC2 parameters change.

13. The method of claim 1, further comprising using the determined time Tss for one or more operational tasks comprising:
configuring the wireless device to receive the one or more SS for the measurement during the time Tss,
combining samples received over the determined time Tss into a measurement result,
determining a cell identification (ID) based on the one or more SS received during the time Tss,
completing a synchronization procedure within the time Tss,
completing the measurement or obtaining a result of the measurement within the time Tss,
time stamping the result of the measurement within the time Tss,
performing filtering of samples of the one or more SS adaptively based on the time Tss,
refraining from changing an RF parameter of a receiver in the wireless device during time Tss,
configuring the receiver to use the same set of receiver beams to receive the one or more SS during the time Tss,
configuring layer 1 and/or layer 3 filtering adaptively based on the time Tss,
determining, based on the time Tss, an amount of time relative to a time of measurement of the one or more SS within which to transmit an UL transmission in response to the measurement of the one or more SS,
determining, based on the time Tss, an amount of time needed to acquire an UL transmission timing,
indicating the time Tss to another node, and
storing the time Tss for future use.

14. A method of operating a network node in a wireless communications network, the method comprising:
transmitting, during a first time period t1, at least a portion of one or more non-beamformed synchronization signals (SS) based on a first cell identification (ID);
transmitting, during a second time period t2, at least a portion of one or more beamformed SS based on the first cell ID;
determining a time Tss for the network node to use in association with a measurement, made by a wireless device, of the one or more non-beamformed SS or the one or more beamformed SS.

15. The method of claim 14, further comprising:
obtaining capability information that characterizes a capability of the wireless device for receiving the one or more non-beamformed SS and the one or more beamformed SS,
wherein the time Tss is determined based on the obtained capability information.

16. The method of claim 14, wherein the time period t1 corresponds to a first set of resources R1 that are pre-defined for transmission of non-beamformed signals.

17. The method of claim 16, wherein the first set of resources R1 are further pre-defined for use with wireless devices in an IDLE state.

18. The method of claim 14, wherein a first set of resources R1 comprising the time period t1 at least partially overlap with a second set of resources R2 comprising the time period t2, and wherein an antenna configuration used for a partially overlapping set of one or more resources to transmit the at least a portion of one or more non-beamformed SS is the same as an antenna configuration used for the partially overlapping set of one or more resources to transmit the at least a portion of one or more beamformed SS.

19. The method of claim 14, wherein the time Tss is determined based on one or more of a set of parameters obtained by the network node, the set of parameters comprising:
a numerology parameter NUM used by the network node to transmit the one or more non-beamformed SS and the one or more beamformed SS,
periodicity parameters T1 and T2 of the one or more non-beamformed SS and the one or more beamformed SS transmitted during the first and second time periods, t1 and t2, respectively, and
bandwidth parameters BW1 and BW2 and bandwidth center parameters BWC1 and BWC2 for the one or more non-beamformed SS and the one or more beamformed SS transmitted during the first and second time periods, t1 and t2, respectively.

20. The method of claim 14, further comprising receiving, from the wireless device, a result of the measurement made by the wireless device, wherein the time Tss is used to configure a waiting time for receiving the result.

21. The method of claim 20, wherein the result is received in a message, the message further comprising an indication of a type of SS used for the measurement by the wireless device, the method further comprising performing an operation based on the indication of the type of SS, wherein the operation includes one or more of:
configuring an SS transmission,
providing mobility or cell change assistance to the wireless device,
configuring one or more intra-frequency or inter-frequency measurements for the wireless device,
adapting DL and/or UL scheduling for the wireless device,
configuring a set of serving cells for the wireless device,
configuring, for one or more wireless devices, specific beams for transmitting to or receiving from each of the one or more wireless devices, and
configuring one or more transmissions to the wireless device.

22. A wireless device for a wireless communications system comprising:
at least one transceiver;
at least one processor operably coupled to the at least one transceiver; and
memory comprising instructions executable by the at least one processor whereby the wireless device is operable to perform a method comprising:
obtaining:
a numerology parameter NUM used by a network node to transmit at least a portion of one or more synchronization signals (SS) during a first time period, t1, and a second time period, t2,
periodicity parameters T1 and T2 of the one or more SS transmitted during the first and second time periods, t1 and t2, respectively, and
bandwidth parameters BW1 and BW2 and bandwidth center parameters BWC1 and BWC2 for the one or more SS during the first and second time periods, t1 and t2, respectively;
determining one or more antenna configuration characteristics C of the network node operable to transmit the at least a portion of the one or more SS during the first and second time periods t1 and t2; and based on the NUM, T1, T2, BW1, BWC1, BW2, and BWC2 parameters and the one or more C characteristics, determining a time Tss associated with a measurement of the one or more SS.

23. A network node for a wireless communications system comprising:
- at least one radio unit comprising at least one transmitter and at least one receiver;
- at least one processor operably coupled to the at least one radio unit; and
- memory comprising instructions executable by the at least one processor whereby the radio access node is operable to perform a method comprising:
- transmitting, during a first time period t1, at least a portion of one or more non-beamformed synchronization signals (SS) based on a first cell identification (IDI;
- transmitting, during a second time period t2, at least a portion of one or more beamformed SS based on the first cell ID;
- determining a time Tss for the network node to use in association with a measurement, made by a wireless device, of the one or more non-beamformed SS or the one or more beamformed SS.

* * * * *

UNITED STATES PATENT AND TRADEMARK OFFICE
CERTIFICATE OF CORRECTION

PATENT NO. : 11,224,024 B2
APPLICATION NO. : 16/479637
DATED : January 11, 2022
INVENTOR(S) : Iana Siomina It is certified that error appears in the above-identified patent and that said Letters Patent is hereby corrected as shown below:

On the Title Page

On Page 2, Item (56), in Column 2, Line 1, delete "33GPP" and insert -- 3GPP --, therefor.

On Page 2, Item (56), in Column 2, Line 8, delete "Nr" and insert -- NR --, therefor.

In the Specification

Column 3, Line 2, delete "1/2m" and insert -- ½ m --, therefor.

Column 4, Line 8, delete "(CRS)." and insert -- (CRSs). --, therefor.

Column 5, Line 12, delete "determined" and insert -- determining --, therefor.

Column 7, Line 4, delete "used" and insert -- is used --, therefor.

Column 7, Line 24, delete "Figure (FIG. 1" and insert -- FIG. 1 --, therefor.

Column 8, Line 27, delete "device (UE)" and insert -- (UE) device --, therefor.

Column 8, Line 55, delete "directly" and insert -- directed --, therefor.

Column 15, Line 40, delete "t1 a with" and insert -- t1 with --, therefor.

Column 15, Line 62, delete "if" and insert -- is --, therefor.

Column 16, Line 8, delete "Tss t1 and Tss t2, where Tss t1" and insert -- $Tss\_t1$ and $Tss\_t2$, where $Tss\_t1$ --, therefor.

Column 16, Line 9, delete "Tss t2" and insert -- $Tss\_t2$ --, therefor.

Signed and Sealed this
Eleventh Day of October, 2022

Katherine Kelly Vidal
*Director of the United States Patent and Trademark Office*

CERTIFICATE OF CORRECTION (continued)
U.S. Pat. No. 11,224,024 B2

Column 16, Line 28, delete "during" and insert -- in --, therefor.

Column 16, Line 32, delete "Tss." and insert the same on Line 31, after "than" as a continuation sub-point.

Column 16, Line 34, delete "in" and insert -- at --, therefor.

Column 16, Line 60, delete "steps" and insert -- steps. --, therefor.

Column 19, Line 10, delete "such those" and insert -- such as those --, therefor.

Column 19, Line 46, delete "receiver" and insert -- receiver 340 --, therefor.

Column 20, Line 38, delete "skill" and insert -- skilled --, therefor.

In the Claims

Column 27, Line 16, in Claim 23, delete "(IDI;" and insert -- (ID); --, therefor.